(12) United States Patent
Woolf et al.

(10) Patent No.: US 7,463,674 B2
(45) Date of Patent: Dec. 9, 2008

(54) TABLES FOR DETERMINING THE SIGNAL STRENGTH OF A RECEIVED SIGNAL IN A FIBRE OPTICS TRANSCEIVER

(75) Inventors: Kevin Reid Woolf, Salinas, CA (US); Angeline Young Rodriguez, East Palo Alto, CA (US); Wei-Yung Chen, Sunnyvale, CA (US); Wingra T. Fang, Saratoga, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 975 days.

(21) Appl. No.: 10/410,419

(22) Filed: Apr. 9, 2003

(65) Prior Publication Data
US 2004/0202476 A1 Oct. 14, 2004

(51) Int. Cl.
H04B 1/38 (2006.01)
H04B 10/00 (2006.01)

(52) U.S. Cl. .................. 375/219; 398/135; 398/128
(58) Field of Classification Search .................. 375/219, 375/224, 345; 250/214 AG, 214 C; 398/128, 398/135, 22–26, 38, 186; 455/39, 232.1, 455/69, 234.1, 73, 234.2, 88; 359/341.41, 359/341.42
See application file for complete search history.

(56) References Cited

U.S. PATENT DOCUMENTS

| | | | |
|---|---|---|---|
| 4,945,229 A | | 7/1990 | Daly et al. |
| 5,379,448 A | * | 1/1995 | Ames et al. ................. 455/524 |
| 5,960,335 A | * | 9/1999 | Umemoto et al. ......... 455/226.2 |
| 6,201,820 B1 | | 3/2001 | Palmer |
| 6,269,251 B1 | * | 7/2001 | Kim ............................ 455/522 |
| 6,307,659 B1 | | 10/2001 | Gilliland et al. |
| 6,321,068 B1 | * | 11/2001 | Zamat ......................... 455/69 |
| 6,546,234 B2 | * | 4/2003 | Choe et al. ................. 455/226.2 |
| 6,852,966 B1 | * | 2/2005 | Douma et al. ........... 250/214 AG |
| 6,891,866 B2 | * | 5/2005 | Robinson et al. ........ 372/29.015 |
| 7,079,775 B2 | * | 7/2006 | Aronson et al. ............. 398/137 |
| 7,107,414 B2 | * | 9/2006 | Hidai et al. ................. 711/154 |
| 7,162,160 B2 | * | 1/2007 | Aronson et al. ............. 398/137 |

(Continued)

FOREIGN PATENT DOCUMENTS

EP 0755133 7/1996

(Continued)

OTHER PUBLICATIONS

SFF Committee "Information Specification for SFP (Small Formfactor Pluggable) Transceiver", SFF-8074i, Rev 1.0, pp. 1-38 (May 12, 2001), <ftp://ftp.seagate.com/sff>.

(Continued)

Primary Examiner—Mohammad H Ghayour
Assistant Examiner—Lawrence B Williams (57) ABSTRACT

A transceiver that includes a receiver configured to receive a data signal, a controller, a first memory that includes a first table associated with a first set of gain values and a second table associated with a second set of gain values, and a second memory accessible by an external host is provided. The controller is configured to access a first value associated with a strength of the data signal from the receiver, access a second value associated with the first value from the first table, generate a third value using the second value, and store the third value in the second memory.

9 Claims, 7 Drawing Sheets

U.S. PATENT DOCUMENTS

| | | | |
|---|---|---|---|
| 7,212,798 B1 * | 5/2007 | Adams et al. | 455/251.1 |
| 2003/0142629 A1 * | 7/2003 | Krishnamurthi et al. | 370/249 |
| 2003/0181180 A1 * | 9/2003 | Darabi et al. | 455/234.1 |
| 2004/0106380 A1 * | 6/2004 | Vassiliou et al. | 455/73 |
| 2004/0136708 A1 * | 7/2004 | Woolf et al. | 398/22 |
| 2004/0198286 A1 * | 10/2004 | Khorram | 455/234.1 |
| 2004/0203443 A1 * | 10/2004 | Woolf et al. | 455/67.11 |
| 2006/0165142 A1 * | 7/2006 | Robinson et al. | 372/38.07 |
| 2007/0066259 A1 * | 3/2007 | Ryan et al. | 455/234.1 |

FOREIGN PATENT DOCUMENTS

| | | |
|---|---|---|
| EP | 0755133 A2 * | 1/1997 |
| GB | 2323500 | 12/1997 |

OTHER PUBLICATIONS

SFF Committee "Specification for Diagnostic Monitoring Interface for Optical Xcvrs", SFF-8472, Rev 9.3, pp. 1-10 and 1-29, (Aug. 1, 2002), <ftp://ftp.seagate.com/sff>.

* cited by examiner

TABLES FOR DETERMINING THE SIGNAL STRENGTH OF A RECEIVED SIGNAL IN A FIBRE OPTICS TRANSCEIVER

THE FIELD OF THE INVENTION

The present invention generally relates to optical transceivers and, more particularly, to tables for determining the signal strength of a received signal in a fibre optics transceiver.

BACKGROUND OF THE INVENTION

Manufacturers or other organizations may collaborate to produce various standards for devices such as electronic devices. These standards may set forth a wide range of design criteria for a device. The criteria may include physical, mechanical, and/or electrical specifications. In order to conform or comply with a standard, a device typically meets all of the called for physical, mechanical, and/or electrical provisions.

One organization that has been formed to set standards for the electronic storage industry is the Small Form Factor (SFF) Committee. The SFF committee may be found at http://www.sffcommittee.com. One set of standards set forth by the Committee includes standards for small form factor pluggable (SFP) transceivers. These standards include the Small Form Factor Pluggable Transceiver MultiSource Agreement (SFP MSA), the SFF-8074i Specification for SFP (Small Form Factor Pluggable) Transceiver, and the SFF-8472 Specification for Digital Diagnostic Monitoring Interface for Optical Transceivers.

A transceiver manufactured in accordance with these SFP standards is configured to report a signal strength of a received data signal in response to a request from a host. In order for a transceiver to report an accurate signal strength, the transceiver must include sufficient information to account for all variables associated with detecting the signal strength. These variables may include variations in the manufacturing process, changes in the ambient temperature of the operating environment, changes in the supply voltage, and limitations of electronic circuitry used to detect the signal strength. Unfortunately, the process of deriving the information associated with these variables can be difficult and expensive.

It would be desirable to minimize the difficulty and cost associated with generating information that allows a transceiver to report an accurate signal strength of a received data signal to a host.

SUMMARY OF THE INVENTION

The present disclosure provides a transceiver that includes a receiver configured to receive a data signal, a controller, a first memory that includes a first table associated with a first set of gain values and a second table associated with a second set of gain values, and a second memory accessible by an external host. The controller is configured to access a first value associated with a strength of the data signal from the receiver, access a second value associated with the first value from the first table, generate a third value using the second value, and store the third value in the second memory.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

According to one embodiment described herein, an optical transceiver is configured to provide a signal strength value associated with a received data signal to a host. A receiver generates a first signal strength value in response to a data signal received by the receiver. In response to receiving a request from the host, a controller accesses the first signal strength value generated by the receiver. The controller accesses a second signal strength value associated with the first signal strength value from a table associated with gain values used by the receiver to generate the relative first strength value. The controller converts the second signal strength value according to a temperature and/or supply voltage to generate a third signal strength value and causes the third signal strength value to be provided to the host.

Figure 1:
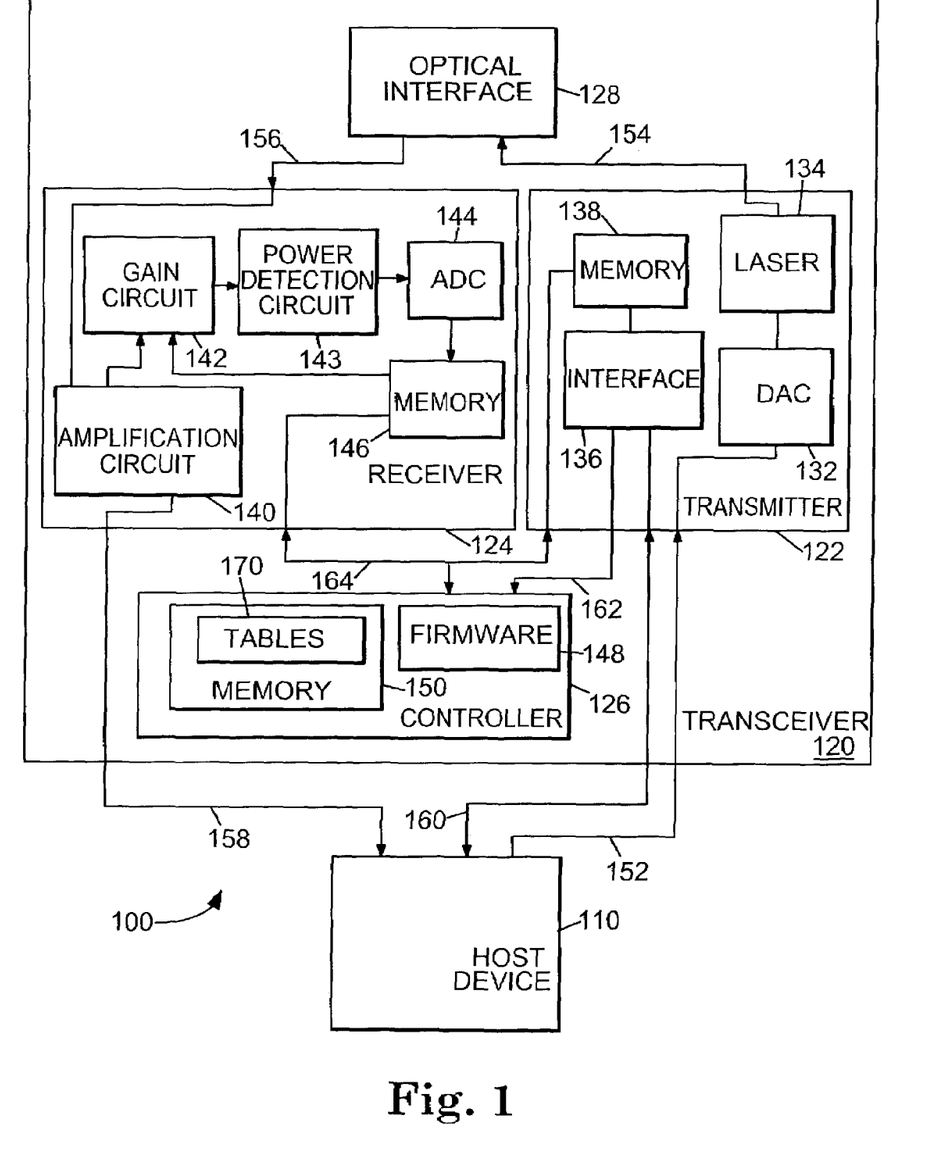
FIG. 1 is a block diagram illustrating an embodiment of a system that includes an optical transceiver that includes multiple tables for determining received signal strength.

FIG. 1 is a block diagram illustrating an embodiment of a system 100 that includes an optical transceiver 120 that includes multiple tables for determining receiving signal strength. As shown in FIG. 1, a host 110 is coupled to transceiver 120. Transceiver 120 includes a transmitter 122, a receiver 124, a controller 126, and an optical interface 128. Transmitter 122 includes a digital-to-analog converter (DAC) 132, a laser 134, an interface 136, and a memory 138. Receiver 124 includes an amplification circuit 140, an on-the-fly programmable gain circuit 142, a power detection circuit 143, an analog-to-digital converter (ADC) 144, and a memory 146. Controller 126 includes firmware 148, a memory 150, and a plurality of tables 170.

Host 110 may be any type of wired or wireless device configured to operate in conjunction with transceiver 120. Host 110 is external to transceiver 120. Examples of such devices include a test system, a server computer system, a personal computer system, a laptop computer system, a handheld computer system, a personal digital assistant, and a mobile telephone.

Transceiver 120 comprises an optical transceiver configured to communicate with host 110 by sending and receiving electrical signals as described in additional detail herein below. Transceiver 120 also communicates with another device (not shown) by sending and receiving optical signals using optical interface 128. Optical interface 128 may be a Fibre Channel interface or another type of optical interface.

In one embodiment, transceiver 120 conforms to the Small Form Factor Pluggable Transceiver MultiSource Agreement (SFP MSA), the SFF-8074i Specification for SFP (Small Form Factor Pluggable) Transceiver, and the SFF-8472 Specification for Digital Diagnostic Monitoring Interface for Optical Transceivers. The SFP MSA, the SFF-8074i specification, and the SFF-8472 specification are available from http://www.sffcommittee.com or ftp://ftp.seagate.com/sff/. In other embodiments, transceiver 120 may conform to other specifications.

Transmitter 122 comprises an optical transmitter configured to receive a digital output signal from host 110 using a connection 152. Digital-to-analog converter 132 converts the digital output signal to an analog output signal and provides the analog output signal to laser 134. The digital output signal and the analog output signal comprise electrical signals. Laser 134 generates an optical output signal in response to the analog output signal and provides the optical output signal to optical interface 128 using a connection 154.

Receiver 124 comprises an optical receiver configured to receive input signals across optical interface 128 using a connection 156. Interface 128 receives an optical input signal from an external source (not shown) and converts the optical input signal to an analog input signal. Amplification circuit 140 amplifies the analog input signal to a saturation point in one or more amplification stages such that the electrical input signal effectively becomes a digital input signal. Amplification circuit 140 provides the digital input signal to host 110 using a connection 158. The digital input signal and the analog input signal comprise electrical signals.

Transceiver 120 also communicates with host 110 using an electrical connection 160. In particular, transceiver 120 receives information and control signals from host 110 using connection 160. Transceiver 120 also provides information to host 110 using connection 160. In the embodiment of FIG. 1, electrical connection 160 couples host 110 to transmitter 122 and may be any suitable serial or parallel connection. One suitable connection would be an I2C connection, as provided by the I2C-Bus Specification available from Philips Semiconductors. In embodiments where connection 160 is an I2C connection, interface 136 comprises an I2C bus interface. In addition, connection 160 and interface 136 may conform to the 2-wire serial CMOS EEPROM protocol defined for the ATMEL AT24C01A/02/04 family of components, as provided by the ATMEL AT24C01A/02/04 Data Sheet available from Atmel at http://www.atmel.com/atmel/acrobat/doc0180.pdf Controller 126 provides control signals to and receives feedback signals from transmitter 122 and receiver 124 using a connection 164. Connection 164 may be any suitable serial or parallel connection. One suitable connection would be an I2C connection, as provided by the I2C-Bus Specification available from Philips Semiconductors. In embodiments where connection 164 is an I2C connection, controller 126 acts as a master and transmitter 122 and receiver 124 act as slaves.

Controller 126 includes firmware 148 that is executable by controller 126 to cause the control signals to be generated and the feedback signals to be received and processed. Memory 150 may be any type or combination of volatile and non-volatile storage including registers, flash memory, or RAM. In other embodiments, controller 126 may use other combinations of hardware and or firmware or software to perform the functions described herein.

As described by the SFP MSA, the SFF-8074i specification, and the SFF-8472 specification, transceiver 120 is configured to provide host 110 with a signal strength associated with the optical data signal received by transceiver 120. As described in additional detail herein below, transceiver 120 performs this function using tables 170.

In the embodiments described herein, the signal strength of the optical data signal received by transceiver 120 is determined by measuring the optical modulation amplitude (OMA) and/or the average power of the optical data signal. In particular, interface 128 generates an analog signal in response to the optical data signal. Amplification circuit 140 receives and amplifies the analog signal and provides the amplified signal to gain circuit 142. Gain circuit 142 further amplifies the amplified signal according to a set of gain values stored in memory 146 by controller 126 and provides the amplified signal to power detection circuit 143. Power detection circuit 143 determines the strength of the optical data signal using the amplified signal received from gain circuit 142. In particular, power detection circuit 143 measures the OMA and/or average power of the optical data signal, generates an output signal that indicates the strength of the optical data signal, and provides the output signal to ADC 144. ADC 144 converts output signal of power detection circuit 143 into a digital power value and stores the digital power value in memory 146. Memory 146 may be any suitable volatile or non-volatile memory such as registers or RAM. In other embodiments, other types of measures of the signal strength may be used.

The strength of the data signal received by transceiver 120 may vary over time. To ensure that transceiver 120 correctly reports the strength of the data signal over the entire range of strengths, controller 126 is configured to adjust the gain values of gain circuit 142 in response to the strength of the data signal. For example, in response to low signal strengths, controller 126 provides relatively high gain values to gain circuit 142 to cause the amplification of the signal to be increased. Conversely, controller 126 provides relatively low gain values to gain circuit 142 to cause the amplification of the signal to be decreased in response to high signal strengths. In this way, controller 126 provides appropriate gain values to gain circuit 142 to ensure that low strength signals have sufficient resolution and that high strength signals do not saturate.

In operation, controller 126 accesses the digital power value from memory 146. In response to receiving the digital power value, controller 126 determines whether the digital power value is within the range of a table in tables 170 that is associated with the set of gain values used by gain circuit 142 in generating the digital power value. If the value is in the range, then controller 126 determines a table value or values associated with the digital power value using the table as described in additional detail below.

If the value is not in the range, then controller 126 causes the gain values of gain circuit 142 to be changed by storing new set of gain values in memory 146. Controller 126 accesses the digital power value subsequent to providing the new set of gain values to memory 146. Controller 126 uses the table in tables 170 associated with this new set of gain values to determine the table value or values associated with the digital power value as described in additional detail below.

The threshold values of the ranges of the tables in tables 170 may be programmed during calibration of transceiver 120. Switching between tables in tables 170 may occur using a variable or fixed hysteresis.

Figure 2A:
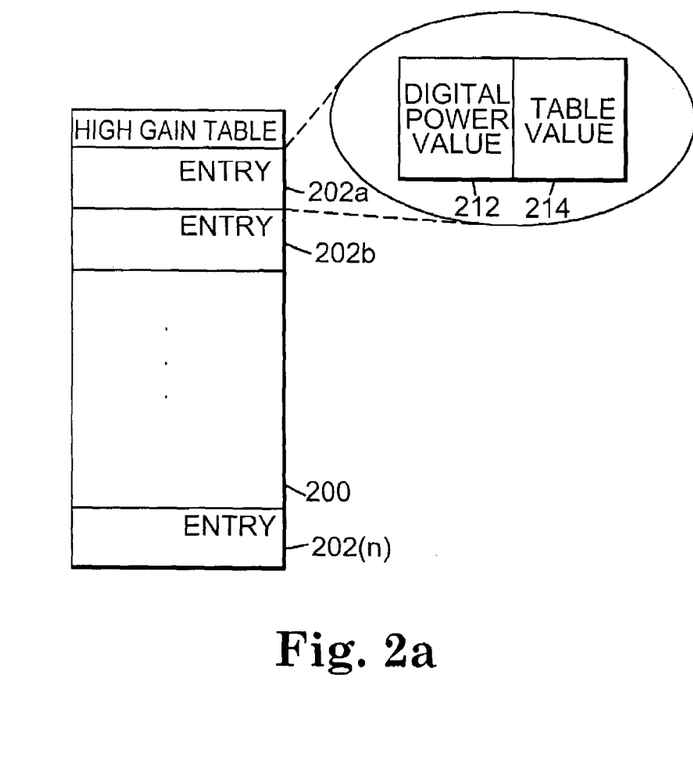
FIG. 2a is a diagram illustrating an embodiment of a first table.
Figure 2B:
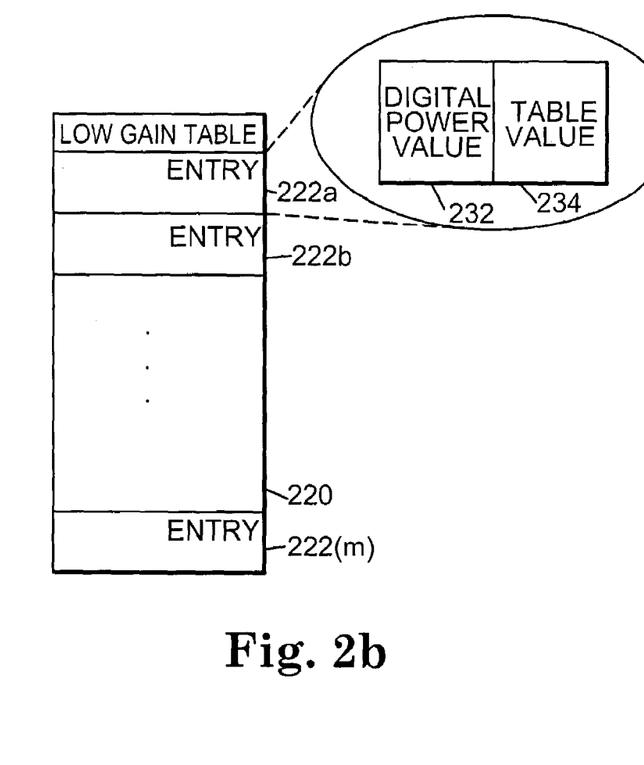
FIG. 2b is a diagram illustrating an embodiment of a second table.

FIGS. 2a and 2b are diagrams illustrating embodiments of a high gain table 200 and a low gain table 220, respectively. High gain table 200 and low gain table 220 are stored in transceiver 120 as tables 170 as shown in FIG. 1. High gain table 200 is associated with a set of high gain values for use with gain circuit 142, and low gain table is associated with a set of low gain values for use with gain circuit 142.

Table 200 includes entries 202a through 202(n) where n is an integer greater than or equal to 1. Similarly, table 220 includes entries 222a through 222(m) where m is an integer greater than or equal to 1. The number of entries each table may or may not be the same.

Entries 202 in table 200 each include a digital power value 212 and a table value 214 associated with the digital power value 212 as shown in FIG. 2a. Entries 222 in table 220 each include a digital power value 232 and a table value 234 associated with the digital power value 232 as shown in FIG. 2b. Digital power values 212 represent the values generated by ADC 144 in response to the signal amplified using the set of high gain values provided to gain circuit 142. Digital power values 232 represent the values generated by ADC 144 in response to the signal amplified using the set of low gain values for gain circuit 142. Table values 214 and 234 correspond to real-world approximations of OMA and/or average power values of the data signal, using a standard measurement unit such as decibels or watts, for each digital power value 212 and 232, respectively.

To determine a table value or values, controller 126 identifies the digital power value or values in table 200 or 220 (depending on the set of gain values) that are closest to the digital power value received from memory 146. Controller 126 reads the table value or values from table 200 or 220 that associated with the closest digital power value or values. Controller 126 generates the table value associated with the digital power value received from memory 146 using the table value or values read from table 200 or 220.

If a digital power value in table 200 or 220 matches the digital power value received from memory 146, then controller 126 uses the table value associated with the digital power value in table 200 or 220 as an intermediate value. If, however, the digital power value received from memory 146 does not match a digital power value from table 200 or 220, then controller 122 interpolates the intermediate value using the table values associated with the digital power values that are closest to the digital power value received from memory 146.

As an example, the digital power value received by controller 126 may be 200, and the table may include digital power values of 192 and 208 that correspond with table values of 150 microwatts (µW) and 160 µW, respectively. In this example, controller 126 may linearly interpolate the table value associated with a digital power value of 200 to be 155 µW.

Subsequent to determining the intermediate value, controller 126 modifies the intermediate value to compensate for variations in temperature and/or voltage such as supply voltage. Controller 126 is configured to detect a temperature and voltage associated with transceiver 120. Memory 150 includes tables of temperature and voltage coefficients (not shown) used in one or more equations that convert the intermediate value to a final value. The coefficients are determined during the manufacturing process and stored in memory 150. The final value comprises the signal strength of the data signal received by transmitter 120.

Controller 126 provides the final value to memory 138. Memory 138 may be any suitable volatile or non-volatile memory such as registers or RAM. From memory 138, the final value is accessible to host 110 as an input power value that indicates the strength of the optical data signal received by transceiver 120.

Figure 3:
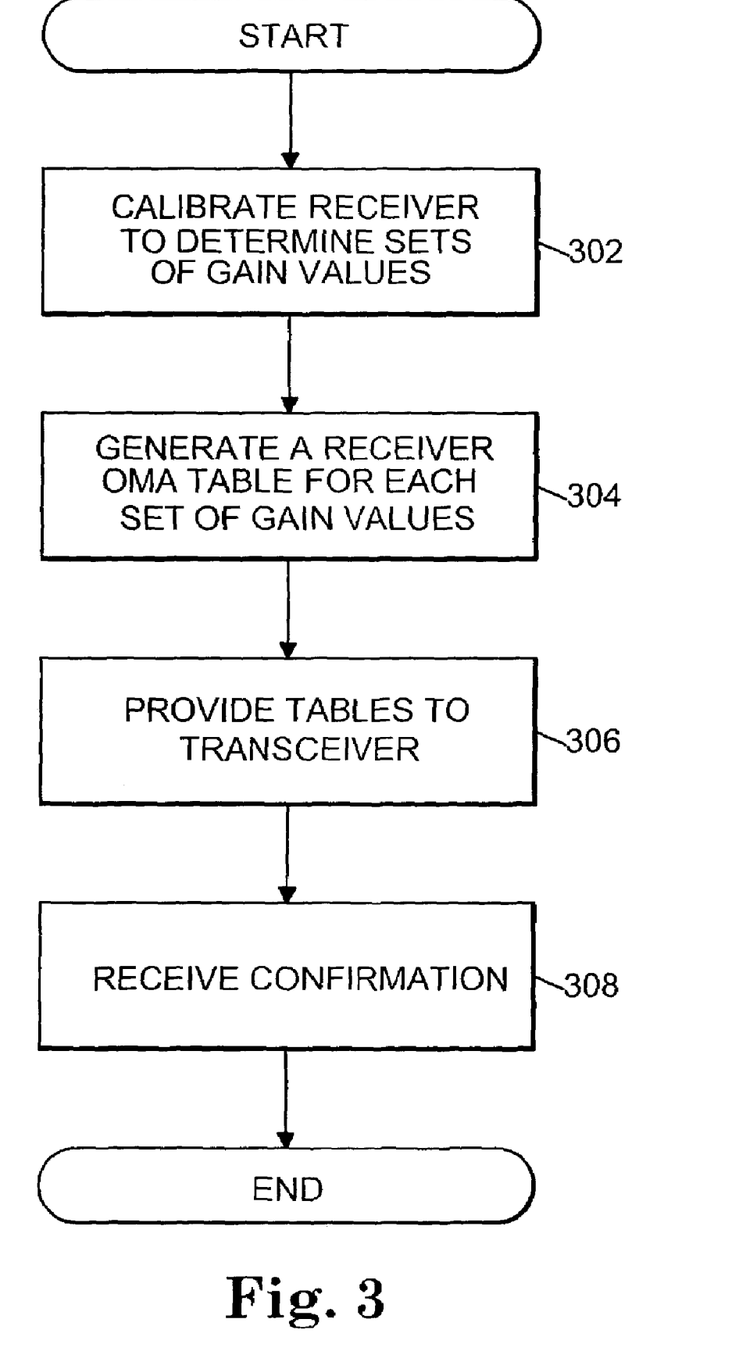
FIG. 3 is a flow chart illustrating an embodiment of a method for generating and storing tables.

FIG. 3 is a flow chart illustrating an embodiment of a method for generating and storing tables 200 and 220. The embodiment of the method of FIG. 3 will be described with reference to FIG. 1. In FIG. 3, host 110 comprises a manufacturing host system configured to calibrate and test transceiver 120 prior to transceiver 120 being provided to an end user. Accordingly, receiver 124 is calibrated by host 110 to determine sets of gain values for gain circuit 142 as indicated in a block 302. Each set of gain values may include an AC gain value, a DC gain value, and an offset value.

In one embodiment, host 110 causes two sets of gain values to be determined. One of the sets of gain values, i.e. a high gain values set, may be used for relatively low signal strengths, such as those represented in table 200, and the other of the sets, i.e. a low gain values set, may be used for relatively high signal strengths, such as those represented in table 220. In other embodiments, any number of sets of gain values may be used to obtain desired accuracies and resolutions of the signal strength over various ranges.

A received signal OMA table is generated by host 110 for each of the set of gain values as indicated in a block 304. For each table, host 110 causes a table value to be generated for each of a set of digital power values generated by ADC 144. Host 110 provides the tables to transceiver 120 as indicated in a block 306. Controller 126 receives the tables from transceiver 122 via interface 136 and connection 160 and stores the tables as tables 170 in memory 150. Host 110 receives a confirmation from controller 126 that the tables have been received as indicated in a block 308.

A manufacturer of transceiver 120 may apply the method of FIG. 3 to each transceiver produced by the manufacturer. In doing so, the values in tables 170 may more accurately account for variations that occur in the manufacturing to cause the true signal strengths received by transceiver 120 to be reflected. Alternatively, a manufacturer may generate the values in tables 170 using one or more transceivers from a batch of transceivers and provide each transceiver in the batch with the same tables 170.

Figure 4:
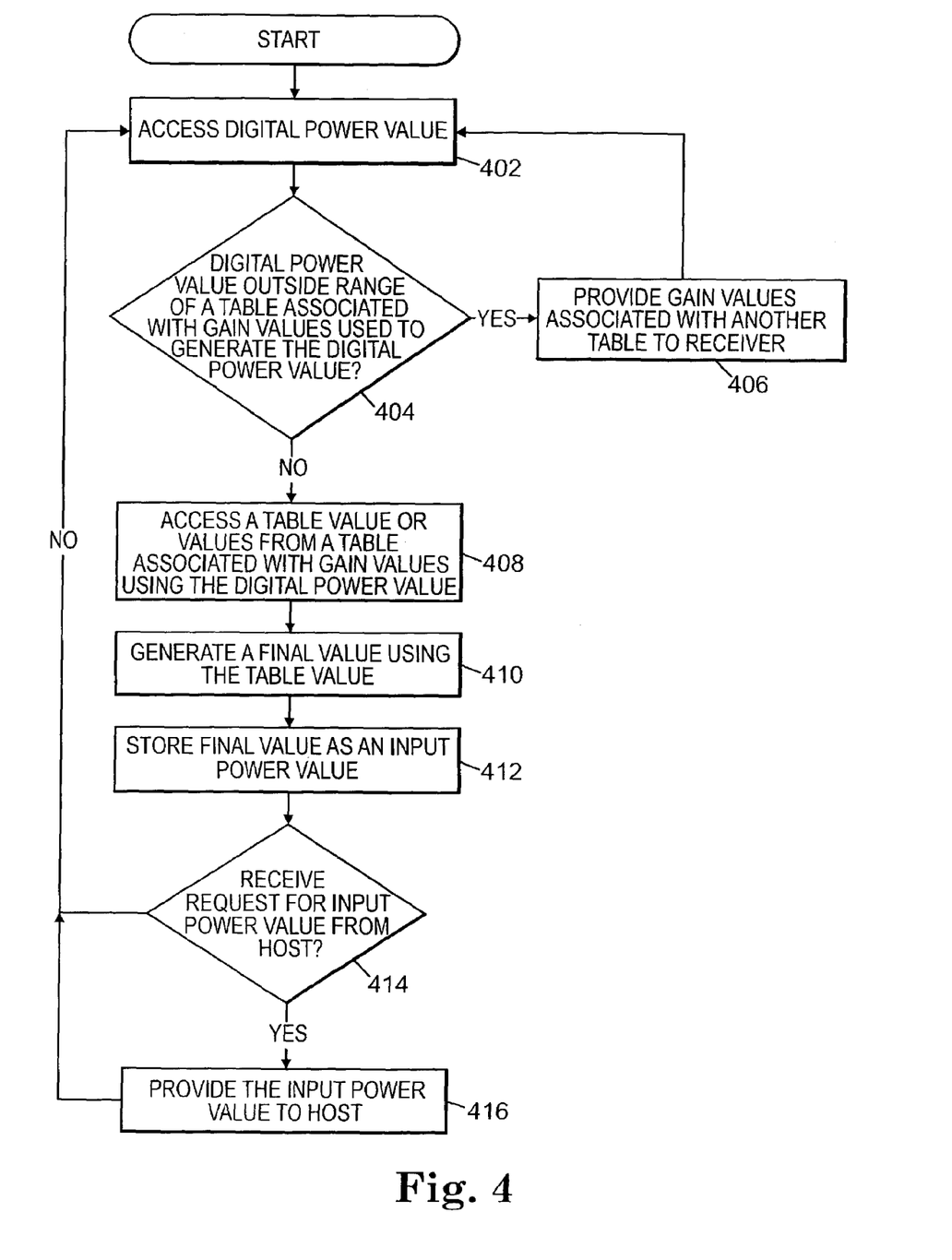
FIG. 4 is a flow chart illustrating an embodiment of a method for providing a signal strength of a received signal to a host.

FIG. 4 is a flow chart illustrating an embodiment of a method for providing a signal strength of a received signal to host 110 as performed by transceiver 120. The embodiment of the method of FIG. 4 will be described with reference to FIG. 1. In the description of FIGS. 4-6 below, host 110 comprises a host system of an end user.

In FIG. 4, a digital power value is accessed by transceiver 120 as indicated in a block 402. A determination is made by transceiver 120 as to whether the digital power value is outside the range of a table in tables 170 associated with gain values used by gain circuit 142 to generate the digital power value as indicated in a block 404. If so, then gain values associated with another table are provided to receiver 124 as indicated in a block 406 and the function of block 402 is repeated using the new gain values.

If the digital power value is not outside the range of a table associated with gain values used to generate the digital power value, then a table value or values is accessed from the table associated with the gain values using the digital power value as indicated in a block 408. A final value is generated using the table value or values as indicated in a block 410. The final value may be interpolated from the table value or values and/or adjusted according to temperature and/or voltage conditions. The function of block 410 may be omitted in circumstances or embodiments where the table value closely approximates the actual input power value. In such a case, the table value is used as the final value. The final value is stored as an input power value as indicated in a block 412.

A determination is made by transceiver 120 as to whether a request has been received from host 110 for the input power value as indicated in a block 414. If a request has been received, then the input power value is provided to host 110 as indicated in a block 416 and the functions of blocks 402 through 412 are repeated. In the embodiment of FIG. 1, host 110 provides a request for the input power value of the received signal to transceiver 120 using connection 160. The request is received by interface 136 in transmitter 122. The input power value is provided to host 110 from memory 138 using interface 136. In other embodiments, host 110 provides a request for the input power value of the received signal in other ways. If a request has not been received, then the functions of blocks 402 through 412 are repeated.

Figure 5:
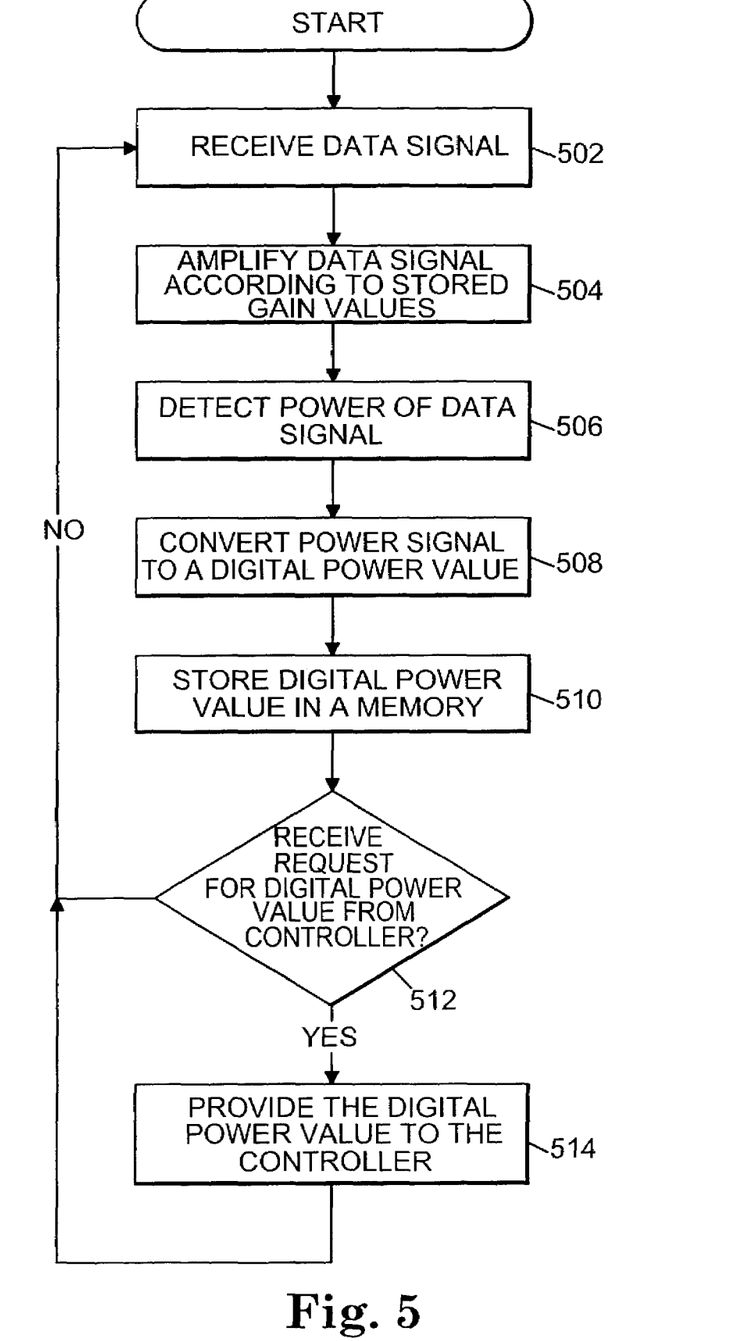
FIG. 5 is a flow chart illustrating an embodiment of a method for receiving a signal and generating information associated with the strength of the signal.

FIG. 5 is a flow chart illustrating an embodiment of a method for receiving a signal and generating information associated with the strength of the signal as performed by receiver 124. The embodiment of the method of FIG. 5 will be described with reference to FIG. 1.

In FIG. 5, a data signal is received by receiver 124 using connection 156 as indicated by a block 502. The data signal is an electrical signal that is generated from the optical signal received by interface 128. The data signal is provided to amplification circuit 140 where it undergoes one or more amplification stages before it is provided to gain circuit 142. The data signal is amplified by gain circuit 142 according to gain values stored by by controller 126 as indicated in a block 504 and provided to power detection circuit 143. The OMA and/or the average power of the data signal is detected by power detection circuit 143 as indicated in a block 506 and is provided to ADC 144 as a power signal. The power signal is converted to a digital power value by ADC 144 as indicated in a block 508. The digital power value is stored in memory 146 as indicated in a block 510.

A determination is made as to whether a request for the digital power value has been received from controller 126 as indicated in a block 512. If a request has not been received, then the functions of blocks 502 through 510 are repeated. If a request has been received, then the digital power value is provided from memory 146 to controller 126 as indicated in a block 514. The functions of blocks 502 and 510 are then repeated. The functions of blocks 502 and 510 may repeated continuously or periodically by receiver 124.

Figure 6:
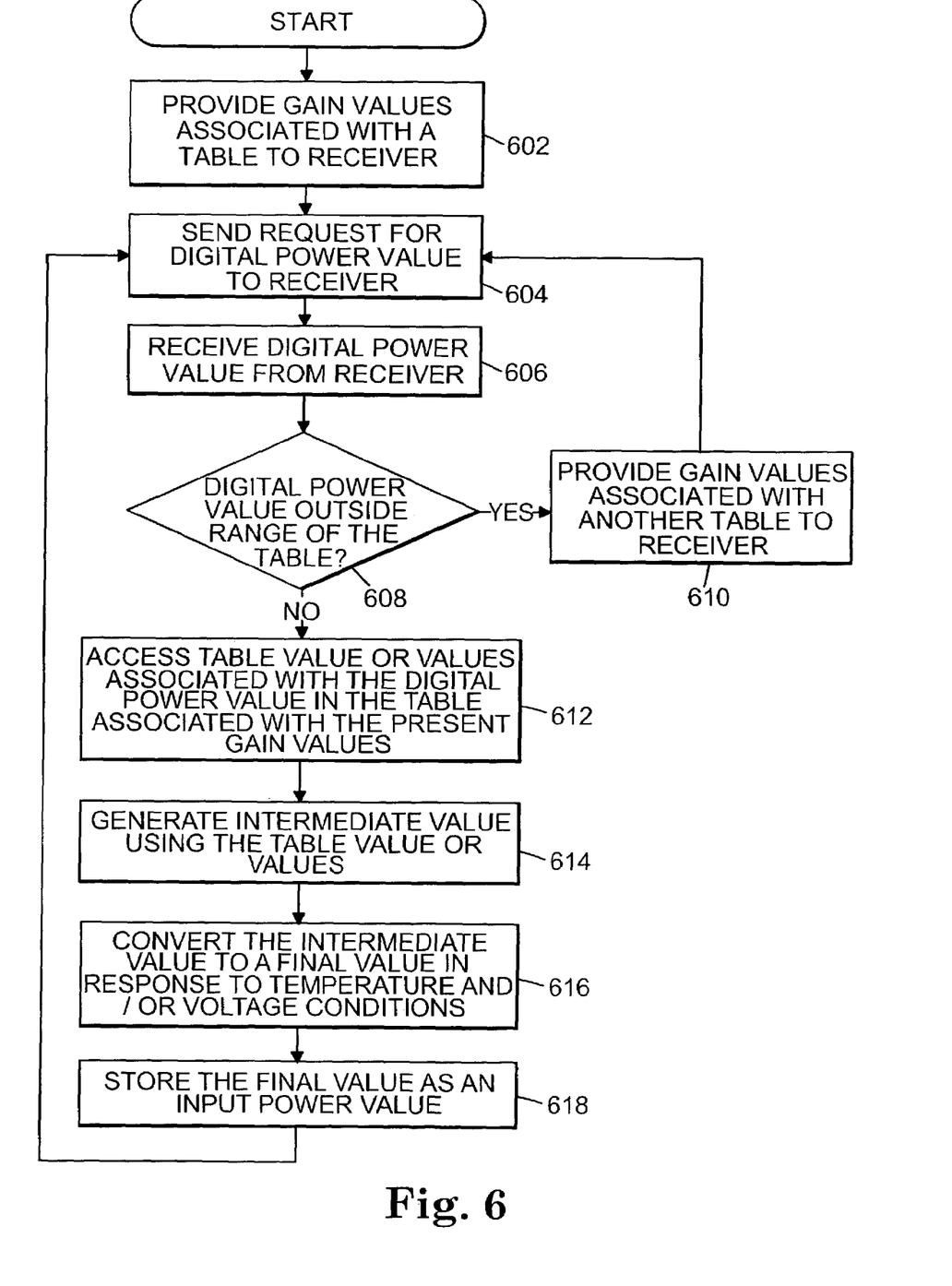
FIG. 6 is a flow chart illustrating an embodiment of a method for providing a signal strength of a received signal in response to a request.

FIG. 6 is a flow chart illustrating an embodiment of a method for providing a signal strength of a received signal in response to a request as performed by controller 126. The embodiment of the method of FIG. 6 will be described with reference to FIG. 1.

In FIG. 6, gain values associated with a table in tables 170 are provided to receiver 124 as indicated in a block 602. Controller 126 records the gain values provided to receiver 124 in memory 150. The provided gain values may be default gain values such as those associated with high gain table 200. Receiver 124 stores the gain values in memory 146 and provides the values to gain circuit 142. Controller 126 sends a request for the digital power value to receiver 124 as indicated in a block 604. Controller 126 receivers the digital power value from receiver 124 as indicated in a block 606.

A determination is made as to whether the digital power value is outside of the range of the table associated with the gain values used by gain circuit 142 as indicated in a block 608. If the digital power value is outside the range, then controller 126 provides gain values associated with another table to receiver 124 for use by gain circuit 142 as indicated in a block 610. Controller 126 records the gain values provided to receiver 124 in memory 150. The function of block 604 is repeated at a later time using the gain values provided by the function of block 610.

If the digital power value is not outside the range of the table, a table value or values associated with the digital power value is accessed in the table in tables 170 associated with the present gain values as indicated by a block 612. The present gain values are those that controller 126 most recently provided to receiver 124 as recorded by controller 126. An intermediate value is generated using the table value or values as indicated in a block 614. To perform the function of block 614, controller 126 may use linear interpolation, if needed, to derive the intermediate value using the table value or values as described above. If interpolation is not needed, then the intermediate value may be equal to a table value.

Controller 126 converts the intermediate value to a final value in response to temperature and/or voltage conditions detected by controller 126 as indicated in a block 616. The function of block 616 may be used where the intermediate value differs from the actual power value under different temperature and/or voltage, such as supply voltage, conditions. The function of block 616 may be omitted in circumstances or embodiments where the intermediate value closely approximates the actual power value.

Controller 126 stores the final value as an input power value in memory 138 which is accessible by host 110 as indicated in a block 618. The function of block 604 is then repeated at a later time.

Figure 7:
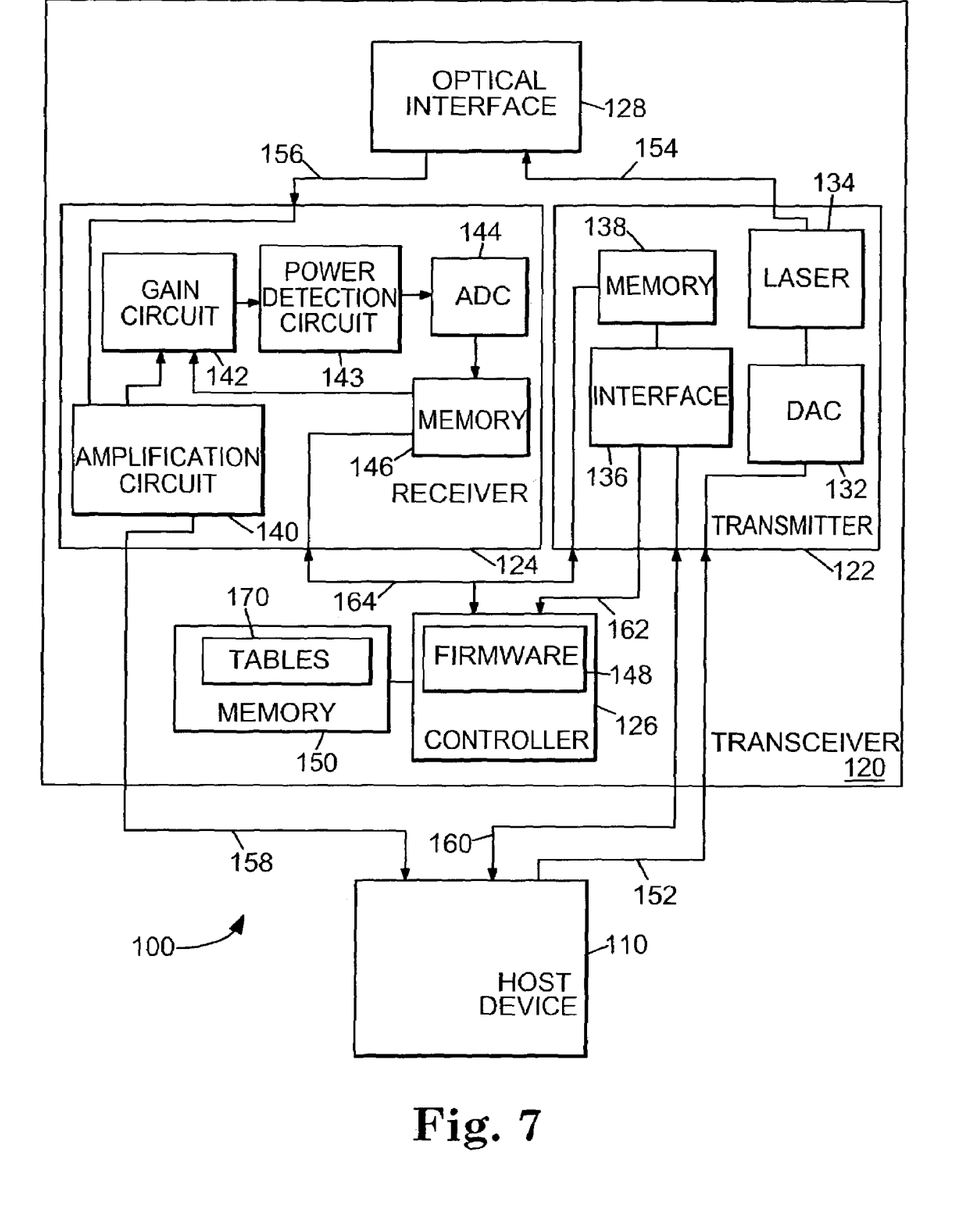
FIG. 7 is a block diagram illustrating an alternative embodiment of a system that includes an optical transceiver that includes multiple tables for determining received signal strength.

FIG. 7 is a block diagram illustrating an alternative embodiment of system 100. The embodiment of FIG. 7 operates in substantially the same way as the embodiment of FIG. 1 as described with reference to FIGS. 2-6. In FIG. 7, however, memory 150 and tables 170 are coupled to controller 126 but are not included in controller 126. This embodiment illustrates that memory 150 and tables 170 may be included in any other portion or component transceiver 120.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A transceiver comprising:
   an optical receiver configured to receive an optical input signal;
   a controller;
   a first memory that includes a first table associated with a first set of gain values and a second table associated with a second set of gain values; and
   a second memory accessible by an external host;
   wherein the controller is configured to access a first value associated with a strength of the optical input signal from the optical receiver, wherein the controller is configured to access a second value associated with the first value from a first or second table dependent upon a range of either table, wherein the controller is configured to generate a third value using the second value, and wherein the controller is configured to store the third value in the second memory.

2. The transceiver of claim 1 wherein the controller is configured to provide the first set of gain values to the optical receiver, and wherein the optical receiver is configured to generate the first value using the first set of gain values.

3. The transceiver of claim 2 wherein the controller is configured to access the first value from the first table in response to the first table being associated with the first set of gain values.

4. The transceiver of claim 3 wherein the controller is configured to provide the second set of gain values to the optical receiver in response to the first value being outside of a range of values associated with the first table.

5. The transceiver of claim 1 wherein the first value comprises a digital value associated with an optical modulation amplitude of the optical input signal.

6. The transceiver of claim 1 wherein the first value comprises a digital value associated with an average power of the optical input signal.

7. The transceiver of claim 1 wherein the controller is configured to convert the second value to the third value in response to a temperature detected by the controller.

8. The transceiver of claim 1 wherein the controller is configured to convert the second value to the third value using interpolation.

9. The transceiver of claim 8 wherein the second value is the same as the third value.

* * * * *